July 3, 1956 A. HORVATH 2,753,530
HIGH Q FREQUENCY TUNER
Filed Nov. 4, 1950 2 Sheets-Sheet 1
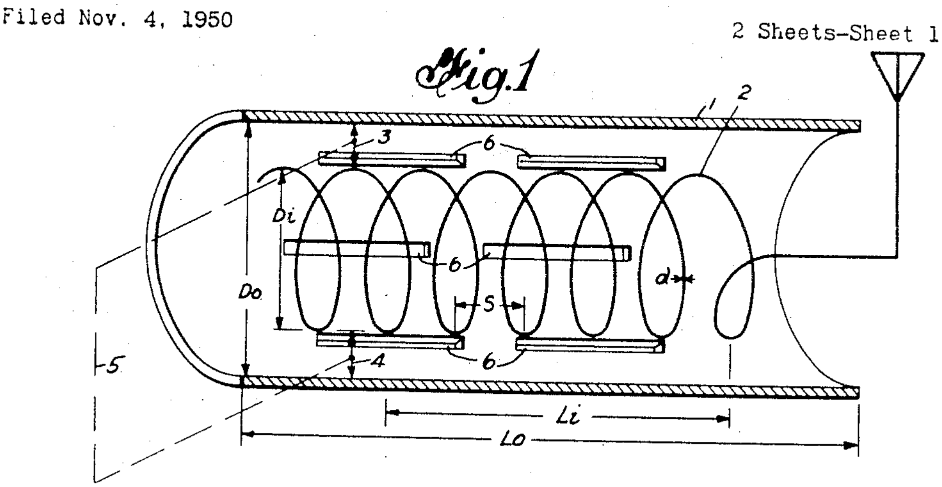
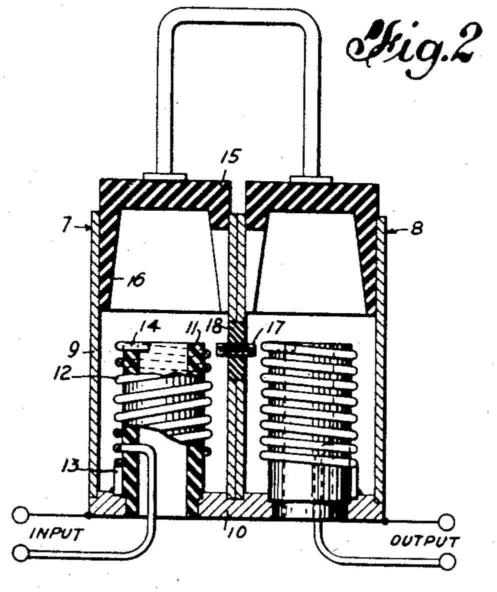
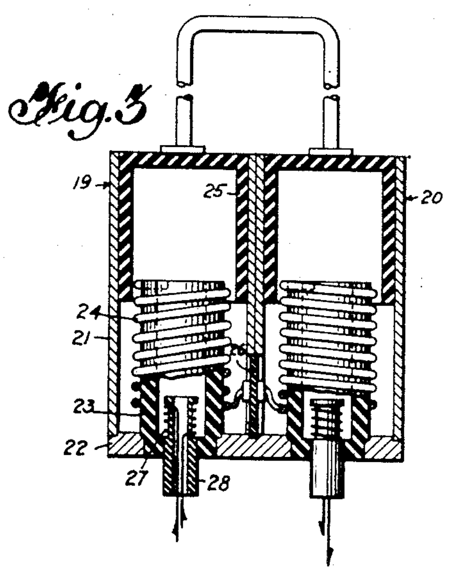
Fig.4
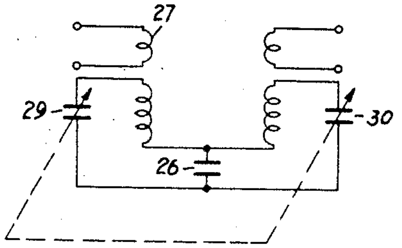
INVENTOR
ALEXANDER HORVATH
BY Percy P. Lantzy
ATTORNEY July 3, 1956 A. HORVATH 2753,530

HIGH Q FREQUENCY TUNER

Filed Nov. 4, 1950 2 Sheets-Sheet 2

INVENTOR
ALEXANDER HORVATH
BY Percy P. Lantzy
ATTORNEY

United States Patent Office 2,753,530

Patented July 3, 1956

2,753,530

HIGH Q FREQUENCY TUNER

Alexander Horvath, Clifton, N. J., assignor to International Telephone and Telegraph Corporation, a corporation of Maryland Application November 4, 1950, Serial No. 194,098

3 Claims. (Cl. 333—73)

This invention relates to resonant coupling circuits and more particularly to a high Q frequency tuner for R. F. and I. F. frequencies.

Heretofore, it was believed that for the higher frequencies a coaxial transmission line with a helical center conductor would be too lossy for use as a resonant circuit. I have found, however, that this is not the case. By controlling certain limits in the structural relationships of the component parts, a very high Q frequency tuner can be made.

It is accordingly an object of this invention to provide a coupling circuit of the resonant frequency type having very high Q for R. F. and I. F. frequencies particularly in the higher frequency bands.

Another object of the invention is to provide a high Q frequency tuner capable of a wide tuning range, which has a high degree of freedom from spurious responses and which is compact and requires small space in chassis construction.

The features of this invention are accomplished by determining the optimum proportions or ratios of certain structural parts of the tuner. I have found that the Q of the tuner is highest when the ratios of three structural relationships of the tuner are selected between certain limits. More particularly, these three relationships comprise: first, the ratio of the diameter of the helix of the wound inner conductor to the diameter or smallest cross-sectional dimension of the outer conductor; second, the ratio of the diameter of the conductor of the helix to the spacing between the centers of adjacent turns thereof; and third, the ratio of the length of the helix to the diameter thereof. The first ratio should not be greater than 0.69 and preferably should be selected between 0.5 and 0.69. The second ratio should not be greater than 0.73 and preferably should be selected between 0.55 and 0.73. The third ratio should not be greater than 3 and preferably should be selected between 2 and 3. When the higher ratios are increased to save space or for other reasons, the Q of the tuner drops off rapidly and when the lower limits are exceeded the Q drops off less rapidly. Thus, while the higher limits are rather critical the lower limits are not and may be exceeded as much as 30% before the Q of the circuit for many uses would be unsatisfactory. However, for the highest Q obtainable, the three ratios should be confined substantially within these preferred limits.

A tuning unit made according to the principles of this invention may be used in many different coupling relationships in high, very-high and ultra-high frequency bands. The tuner may be used in transmitter circuits as a filter or as an antenna tuning unit. It may also be used in receiver circuits as either or both the R. F. and I. F. tuning units. Where used as an R. F. tuner high R. F. selectivity is obtained making it possible to employ an unusual low intermediate frequency. This low I. F. frequency thus made possible by the use of tuners of this invention not only discriminates against spurious signals generated by high order mixing but provides greatly improved I. F. frequency stability. By tuning the I. F. with units of this invention a large number of channels may be received using a single superheterodyne circuit with local oscillator directly crystal controlled by different crystals. It should be understood, however, that the foregoing examples of where and how the tuner may be employed are not to be regarded as all inclusive but as illustrative only since many other applications of the tuner will be readily recognized by those skilled in the art.

The above-mentioned and other features and objects of this invention and the manner of attaining them will become more apparent and the invention itself will be best understood, by reference to the following description of an embodiment of the invention taken in conjunction with the accompanying drawings, wherein:

Fig. 1 is a schematic illustration of a high Q tuner according to the principles of this invention shown as an antenna tuning unit for transmitters;

Fig. 2 shows a vertical sectional view of an R. F. filter employing two units;

Fig. 3 shows a vertical sectional view of a modified form of R. F. tuner;

Fig. 4 is a schematic illustration of the equivalent circuit for the tuner of Fig. 3;

Figure 5:
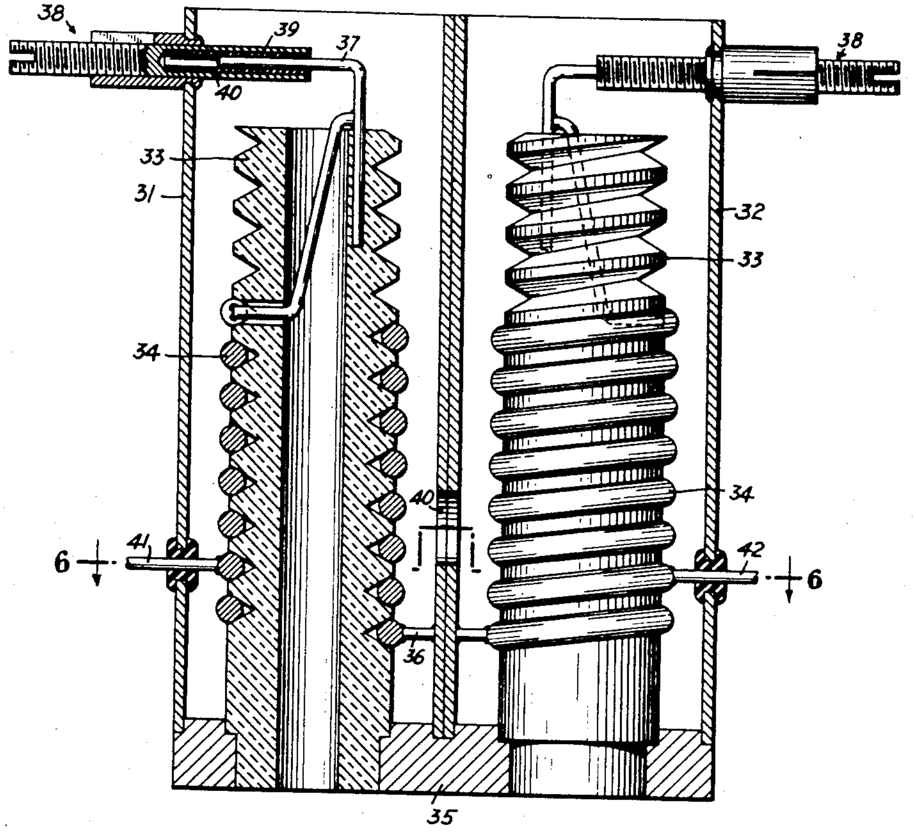
Fig. 5 is a vertical sectional view of still another embodiment of the tuner.

Referring to Fig. 1 of the drawings a schematic illustration of a high Q frequency tuner of the resonant coaxial type is shown coaxled as an antenna tuning unit. The unit includes an outer tubular member 1 of conductive material, which is sometimes referred to as a shield, and a helicoidally wound inner conductor 2. The helix of the inner conductor according to this invention bears certain predetermined structural relationships with respect to the dimensions thereof and to the dimensions of the outer conductor 1. The outer conductive member 1 is shown to be open at both ends with the end portions thereof extending beyond the ends of the helix 2. While the member 1 and the helix 2 may not be shorted or connected together at one end, the shorting of these two members such as by sliding contacts 3, 4 or by soldered connections is preferred so that the unit operates as a quarter-wave resonant cavity. Where the member 1 and the helix 2 are not shorted, the unit operates as a half-wave resonant line. In the embodiment of Fig. 1 the shorting elements 3, 4 are shown to be ganged together as indicated at 5 whereby the shorting members may be moved axially of the unit to vary the effective length thereof.

As indicated in Fig. 1 the tubular member 1 has a diameter $D_o$ and a length $L_o$, the helix has a diameter $D_i$ and a length $L_i$. The conductor forming the helix 2 has a diameter $d$ and the turns of the helix have a spacing $s$ between the centers of adjacent turns. As previously stated in order to have the highest possible Q for the resonant line, each unit should have three structural ratios carefully selected within certain limits. These ratios may be represented as follows: the ratio of the diameter of the helix to the diameter of the outer conductor $$\left(\frac{D_i}{D_o}\right)$$

should not be greater than 0.69 and preferably should be selected between 0.5 and 0.69. The coil diameter $D_i$ is here taken to be the outside diameter of the coil while the diameter $D_o$ of the member 1 is the inner diameter thereof. Should the outer conductor be rectangular in cross-section, the ratio limit of 0.69 may be increased by 5 or 6 percent, the measurement for $D_o$ being the smallest cross-sectional dimension of the rectangular member. The ratio $$\left(\frac{d}{s}\right)$$

of the diameter ($d$) of the conductor of the helix to the spacing ($s$) between centers of adjacent turns thereof should not be greater than 0.73 and preferably should be selected between 0.55 and 0.73 with the optimum being between 0.65 and 0.68. The ratio $$\left(\frac{L_i}{D_i}\right)$$

of the length ($L_i$) of the helix to the diameter ($D_i$) thereof should not be greater than 3 and preferably should be selected between 2 and 3. The size of wire to be used will largely determine this ratio. The size of the wire may be obtained experimentally or with the aid of the approximate formula, $$T=.00125\frac{D_o}{D_i}$$

(microseconds per axial foot), where T is the time delay of the line.

In the construction of a resonant cavity unit according to this invention, several precautions should be taken. In the case of the sliding connectors 3, 4 it is important that they be kept perfectly clean so as to have good contact. Dirty contacts may result in the loss of up to 40% in Q. It is preferred, however, to solder the shorting connections thereby making permanent the effective length of the tuning unit.

The outer conductor 1 may be provided with slots parallel to the axis thereof as indicated at 6. There is a theoretical advantage in having these slots but it is very small. For example, an increase of 8% in Q is realized by making the outer conductor in the form of a three-sided right angle trough instead of a concentric tube. Small slots may ruin the Q by as much as 40% if metallic objects are allowed to be located closely adjacent or in poor contact with the portions of the member 1 containing the slots.

Another precaution to be taken is in the design of the ends of the coil comprising the helix 2. At the high voltage or open end of the coil, the coil should end abruptly and not flare out or turn into the center of the helix. The outer conductive member 1 and particularly the end plate thereof, if it is provided with one as in Figs. 2, 3 and 5, should extend beyond the ends of the coil by an amount equal to the length of the radius of the coil. If member 1 can be extended longer it will improve further the Q of the unit. At the grounded end of the coil, should the coil be grounded or shorted to the ground through the outer member 1, a space approximately equal to the coil radius should be provided between the ground connection and the first turn of the coil.

Coupling into and out of the cavity may be made by tapping the coil by direct connection by capacity probes, by means of diaphragm openings in the outer member 1, by means of loops or coils located either between the helix 2 and the member 1 or inside the helix at the grounded end thereof.

The outer conductor 1 may either be cylindrical or made of a tube rectangular in cross-section. Square or rectangular tubing lends itself to the placement of two or more units side by side with either a probe at the open end of the helix to couple the two units or an iris open at the shorted end for coupling. Rectangular tubing with two coils in a common shield may also be used except that they are excessively over-coupled when the dimension ratios hereinbefore mentioned are employed.

Referring to Fig. 2, an R. F. filter is shown comprising two tuning units 7 and 8. Each unit comprises an outer tubular conductor 9 mounted on a conductive plate 10. The plate 10 contains an opening for each unit to receive a dielectric tubular core 11 onto which is wound a helical coil 12. The coil is grounded at 13 to the base plate 10 which in effect shorts that end of the helix to the outer member 9. The upper or open end 14 of the helix 12 is shown to end abruptly. The capacitance of the unit is provided by the spacing of the outer conductor 9 with respect to the turns of the helix. This capacitance may be varied by moving a tuning slug 15 of dielectric material axially within the upper end of the outer conductor 9. The slug as shown is provided with an annular tapered wall 16. The slugs preferably having a four degree taper in the direction of the coil. Tuning ranges of plus or minus 13% are practical and easy to realize with this type of tuning slug. To provide a coupling between the two units, the engaging walls of the two units are provided with a probe 17 mounted in an insulating diaphragm 18.

A filter according to Fig. 2 was built and successfully operated at 106 to 140 megacycles, the filter having the following dimensions: each tubular member was 1⅛" outer diameter with a wall thickness of .065" and a length of 2¼". The diameter of the helix was .64" and the length of the helix was 1$\frac{1}{16}$". The cores 11 and the tuning slugs 15 were made of Texolyte 1422. The unloaded Q of each unit tested 580 and this Q changes very little over the frequency band of 106 to 140 megacycles, the frequency range being obtained by a one inch tuning adjustment of the slugs. The loaded Q of each unit before coupling was 300.

In addition to the above example, other high Q quarter-wave lumped transmission line tuners have been made with higher Q. One was built for 120 megacycles in 1½" shields which had an unloaded Q of around 880.

Referring to Figs. 3 and 4, another R. F. tuner is shown comprising two identical units 19 and 20. These units are similar to the ones shown in Fig. 2 each having an outer shield 21, a conductive base 22 and a tubular dielectric core 23 to support a helical coil 24. A dielectric tuning slug 25 of cylindrical form is contained in the upper end of the shield for adjustment between the coil and the shield. The two coils are open ended in the upper ends thereof and are coupled capacitatively to the adjacent walls of the associated shield. The other or lower ends of the two coils are coupled by condenser 26 carried in the common wall of the two units. A coupling loop or coil is provided for each unit as indicated by the coil 27, the latter being supported on a dielectric core 28 carried by the core 23 whereby the coupling loop 27 is disposed coaxially within the helical coil 24.

Fig. 4 shows the equivalent circuit for the double tuner of Fig. 3, the corresponding parts being identified by the same reference characters. The condensers 29, 30 represent the capacitance between the shield and the helix that is controlled by the tuning slugs 25.

Figure 6:
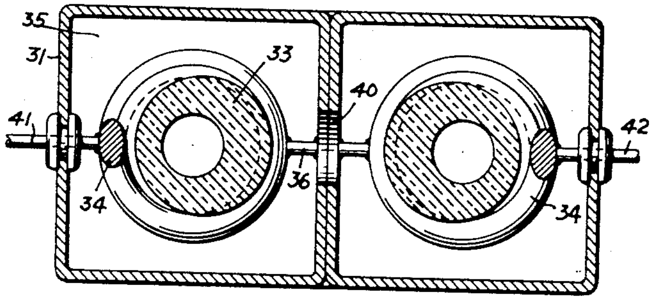
Fig. 6 is a cross-sectional view taken along lines 6—6 of Fig. 5.

Referring to Figs. 5 and 6 of the drawings, another embodiment of the double tuner is shown. The tuners comprise two rectangular shields 31, 32. The shield 31 has mounted therein a dielectric core 33 which has a spiral groove in the outer surface thereof to receive the turns of the helicoidally wound conductor 34. The lower end of the shield is closed as indicated by the bottom plate 35. The lower end 36 of the inner conductor 34 is connected such as by soldering to the end plate 35. The upper end of the conductor 34 is connected to a right angle conductor 37 carried by the core 33. The capacitance between the shield and the coil is controlled by an adjustable condenser 38 which comprises a threaded sleeve 39, threadably adjustable with respect to the shield. The sleeve 39 is lined interiorly with dielectric material 40$a$ to receive in telescoping manner the end portion of conductor 37. By adjusting the sleeve 39 the capacitance between the shield 31 and the coil 34 may be trimmed as desired. To provide coupling between the two adjacent units an opening 40 is provided in the common wall adjacent the grounded ends of the inner conductors 34. Input and output lead connections are shown at 41 and 42.

While I have described above the principles of my invention in connection with specific apparatus, it is to be clearly understood that this description is made only by way of example and not as a limitation to the scope of my invention as set forth in the objects and the accompanying claims.

What is claimed is:

1. A high Q frequency turner of the resonant coaxial type, comprising a tubular member of conductive material, a helically shaped conductor disposed within and coaxially of said tubular member, means connecting one end of the helical conductor to said tubular member, an input lead, means coupling said input lead to said helical conductor a given distance from said one end thereof, the other end of said helical conductor being disposed in spaced relation to said tubular member, means for adjusting the capacitance between said other end and said tubular member, output coupling means disposed adjacent said helical conductor between the ends thereof, the means for adjusting the capacitance between said other end and said tubular member including a threaded bushing carried by a wall of said tubular member, an element threadably received in said bushing, said threaded element having a cylindrical portion containing a sleeve of dielectric material, and the end of said helical conductor being provided with a straight portion receivable in said sleeve in accordance to the threaded adjustment of said element with respect to said bushing.

2. A high Q frequency tuner of the resonant coaxial type, comprising a tubular member of conductive material, a conductive base closing one end of said tubular member, a core of dielectric material carried by said base in coaxial relationship within said tubular member, a conductor helically wound on said core, means connecting one end of said helical conductor to said tubular member adjacent the closed end thereof, and input lead connected to one of the turns of said helical conductor adjacent the closed end of said tubular member, the other end of said helical conductor having a straight portion, a cylindrical element carried by said tubular member, said cylindrical element having a sleeve of dielectric material therein receiving said straight end portion of said helical conductor, means for adjusting said cylindrical element to vary the length of said straight conductor received in said sleeve, and means anchoring the helical conductor to said core at the end thereof adjacent said straight end portion.

3. A high Q tuner comprising a pair of resonant coaxial units each having a tubular member, a helical conductor disposed within and coaxially of said tubular member, means connecting one end of the helical coil to said tubular member, the other end of said helical coil being disposed in unconnected relation with respect to said tubular member and means movable relative to said coil for adjusting the capacitance between the coil and said tubular member, an input lead for one of said coaxial units, an output lead for the other of said coaxial units, each said lead being coupled to the respective coil of the corresponding unit at a location between the ends of the coil, and means carried by the adjacent walls of the tubular members of said two units for coupling frequency energy between the spaces directly adjacent said helical coils, and the means movable relative to said coil for adjusting the capacitance between the coil and said tubular member including a straight end conductor for said coil, means anchoring the coil adjacent said straight portion, a cylindrical element, a sleeve of dielectric material carried within said cylindrical member and receiving therein said straight portion, and means supporting said cylindrical element on said tubular member for adjustment lengthwise of said straight portion.

References Cited in the file of this patent

UNITED STATES PATENTS

| | | |
|---|---|---|
| 2,109,843 | Kassner | Mar. 1, 1938 |
| 2,163,775 | Conklin | June 27, 1939 |
| 2,383,475 | Dodington | Aug. 28, 1945 |
| 2,388,049 | Goode | Oct. 30, 1945 |
| 2,422,458 | Amy et al. | June 17, 1947 |
| 2,428,272 | Evans | Sept. 30, 1947 |
| 2,465,102 | Joy | Mar. 22, 1949 |
| 2,503,084 | White et al. | Apr. 4, 1950 |
| 2,513,761 | Tyson | July 4, 1950 |
| 2,527,608 | Willoughby | Oct. 31, 1950 |
| 2,579,789 | Bussard | Dec. 25, 1951 |
| 2,589,092 | Kihn et al. | Mar. 11, 1952 |
| 2,677,809 | Bradburd et al. | May 4, 1954 |

OTHER REFERENCES

Smith: Radiotron Designer's Handbook, 3rd edition, 1941, distributed in U. S. A. by RCA Manufacturing Company, Inc., Harrison, New Jersey, pp. 152–156. (Copy in Library of Congress.)

Medhurst: Wireless Engineer, vol. 24, No. 282, March 1947, pages 80-92. (Copy in Scientific Library.)